MANUFACTURE OF METAL FLUORIDES

Horace Q. Trout, Brooklyn, N.Y., and Anthony W. Yodis, Whippany, N.J., assignors to Allied Chemical Corporation, New York, N.Y., a corporation of New York
No Drawing. Filed Jan. 30, 1963, Ser. No. 255,096
8 Claims. (Cl. 23—88)

This invention relates to processes for making metal fluorides, particularly metal fluorides in which the metal is in its highest valence state. Typical metal fluorides which may be made in accordance with the invention are those which boil below about 55° C. at atmospheric pressure and which freeze above the freezing point of anhydrous hydrogen fluoride.

Major objects of the invention lie in provision of processes for making metal fluorides by direct, one-step fluorination of certain metallic form metals without use of fluorinating agents such as elemental fluorine or metal fluorinating agents of the type of cobaltic fluoride, silver fluoride and lead fluoride. Handling of elemental fluorine is hazardous, and use of metal fluoride fluorinating agents requires refluorination of such agents with elemental fluorine in a separate operation. The present invention provides for a direct fluorination of certain metals to make the corresponding highest valence fluoride by procedures which do not entail the foregoing disadvantages.

In accordance with the invention, with regard to direct fluorination of certain metals, it has been found that a nitrosyl fluoride-hydrogen fluoride complex, $NOF.3HF$, is an unexpectedly powerful fluorinating agent, much more so than anhydrous HF and not much less so than the most powerful fluorinating agents such as elemental fluoride, fluorine halides, and metal fluoride fluorinating agents such as cobaltic fluoride. The invention involves the discovery of the facility with which $NOF.3HF$ complex reacts with certain herein disclosed metals in metallic state, i.e. a reactability not much less than that of elemental fluorine itself, to form not only fluorides of such metals but fluorides wherein the metal is in its highest positive valence state. In addition to the discovery of the potency of the $NOF.3HF$ complex as a fluorinating agent, the invention includes the finding of reaction conditions which, in conjunction with the remarkably high fluorinating properties of $NOF.3HF$, afford operating advantages which will be obvious from the following description. The metal fluoride products of the invention, because of their volatility, are much sought-for intermediates for use in processes such as those directed to production of high purity metals.

A notable advantage provided is that the $NOF.3HF$ fluorinating agent is an easily handleable, substantially water-white liquid under standard conditions of temperature and pressure. The nitrosyl fluoride-hydrogen fluoride complex, $NOF.3HF$ utilized as a reactant in accordance with the present invention, may be made by reaction of nitrosyl chloride and anhydrous HF, for example as follows.

The reactor employed was an unpacked nickel tube 1" I.D. x 36" long mounted in an electrically heated furnace 30" long. Throughout the run, the reactor was heated to about 60° C. During a period of about 4 hours, a vaporous mixture consisting of about 11.3 mols (226 g.) of HF and about 1.82 mols (118 g.) of NOCl was passed into the reactor. Ratio of HF to NOCl was about 6 to 1, and reaction contact time was about 18 sec. Products exiting the reactor were passed into the bottom of a 1 inch by 2 foot vertically disposed nickel still packed with nickel helical packing, and provided at the top with a reflux condenser cooled by Dry Ice-acetone mixture. The HCl formed passed through the reflux and was absorbed by a water scrubber located after the still. All other materials exiting the reactor were condensed and held in the still during the run. On completion of the run, the condensate thus collected was distilled and there were recovered about 45 gms. (0.69 mol.) of a fraction boiling in the range of minus 5 to zero degrees C. and comprising mostly NOCl; about 86 gms. (4.3 mols) of a fraction boiling in the range of 17–20° C. and comprising mostly HF; about 60 gms. of a fraction boiling in the range of 63–69° C.; and about 96 gms. of a pot residue boiling above about 70° C. The 63–69° C. fraction was redistilled and had a boiling point of about 68° C. The fraction was analyzed for total fluorine, NOF, HF and nitrogen, and as a result identified as liquid $NOF.6HF$ complex. The pot residue fraction on redistillation showed an atmospheric pressure boiling point of about 95° C., and on analysis for total fluorine, NOF, HF and nitrogen was identified as liquid $NOF.3HF$ complex. The $NOF.3HF$ complex is usually available in the form of a water-white liquid which boils at about 95° C.

Metals which may be used as metallic starting materials in practice of the invention include tungsten and molybdenum. In accordance with the invention, it has been found that the corresponding highest positive valence state fluorides, i.e. tungsten hexafluoride and molybdenum hexafluoride, may be conveniently and efficiently made by reaction of metallic tungsten or molybdenum with $$NOF.3HF$$

$WF_6$ boils at about 19.5° C. (atmospheric pressure) and freezes at about 2.5° C. and $MoF_6$ boils at about 35° C. and freezes at about 17° C.

For convenience, the invention is described mostly in connection with production of tungsten hexafluoride, $WF_6$, by reaction of metallic tungsten with the $NOF.3HF$ complex fluorinating agent. Theoretical reaction conditions appear to be illustrated by

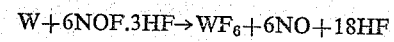

$$W + 6NOF.3HF \rightarrow WF_6 + 6NO + 18HF$$

Representative practice of the invention process comprises introducing into a reaction zone metallic metal selected from the group consisting of tungsten and molybdenum, subjecting such metal in the reaction zone at reactive fluorinating temperature to the action of $NOF.3HF$ complex to thereby effect formation of the fluoride of the metal in vaporous form, and discharging the vaporous metal fluoride from the reaction zone.

Apparatus which may be employed is relatively simple and includes principally a reactor and an associated condenser. The reactor, which may be made of nickel, may be provided at the top with a removable cover permitting charging of solids and with a valved inlet for controlled introduction of liquid fluorinating agent, and with a gas outlet. The latter may be connected by a conduit to the inlet of a suitable condenser or cold trap adaptable for immersion in a low-temperature refrigerating medium and provided with a vent to facilitate discharge from the trap of uncondensable gaseous material. In general, apparatus may be along the lines described in the appended illustrations of practice of the invention.

In the case of manufacture of tungsten hexafluoride, metallic tungsten and fluorinating agent may be charged to the reactor in which the tungsten and the $NOF.3HF$ are reacted to produce $WF_6$, HF and NO all in vaporous form. Total off-gas of the reactor may be passed into a condenser refrigerated e.g. by an acetone-Dry Ice mixture, to temperature of about minus 78–80° C. In view of the 2.5° C. melting point of $WF_6$, the latter condenses to a solid in the condenser while HF, M.P. minus 92° C., remains in the liquid state. Nitric oxide (NO) gas is discharged from the condenser. At the end of a run, most of the liquid HF including a little entrained $WF_6$, may be decanted off, and the solid residue from the cold trap transferred to a melter which may be held at a temperature, say 5–10° C., i.e. a few practicable degrees C. above the melting point of $WF_6$, and a few practicable degrees C. below the boiling points of HF and $WF_6$. On standing, $WF_6$ and HF separate in liquid layers, the upper layer comprising liquid HF and a little $WF_6$, while the lower substantially pure $WF_6$ layer, constituting the tungsten hexafluoride product of the invention in liquid form, may be drawn off and recovered as such. If desired the $WF_6$ may be distilled for greater purity. The upper HF layer may be recycled.

While the metallic metal to be used as starting material may be in block or chunk form, or granular as coarse as e.g. 10 mesh, it is preferred that the starting metal be comminuted and not coarser than about 20 mesh, and more usually in powdered condition.

The NOF.3HF has strong solvent properties with respect to the metals described, and metal and fluorinating agent may be brought together in any suitable way. However, to avoid too violent reaction and possible carry-over of unreacted metal in the reactor exit gas, it is preferred to charge the metal to the reactor and thereafter introduce the liquid fluorinating agent rather slowly, optimum rate of introduction of fluorinating agent being readily determinable by experience.

It has been found that NOF.3HF fluorinating agent and the metals described react readily at about room temperature. Reactions may vary from not notably exothermic to moderately so in the case of tungsten. While reaction temperature may be anything such as to maintain NOF.3HF in the reactor substantially in liquid phase, down to e.g. minus 50° C., low reaction temperatures are not preferred. In general, temperatures in the reactor should be maintained within the range of a few practicable degrees C. above the vaporization point of the metal fluoride to be formed and a few practicable degrees C. lower than the approximate 95° C. boiling point of the fluorinating agent so that the sought-for metal fluoride is produced in vaporous form dischargeable from the reactor, and so that the fluorinating agent in the reactor is maintained substantially in liquid phase to facilitate utilization of the same, and to avoid fluorinating agent carry-over with the reaction zone exit. In practice of all embodiments of the invention, maximum reaction temperature of about 65° C. at atmospheric pressure is preferred. In the case of production of $WF_6$, reaction temperatures are preferably in the range of about 10–65° C., and in production of $MoF_6$, preferred temperatures are about 40–65° C. Usually application of great amount of extraneous heat to a reaction is unnecessary, although some heat may be furnished to facilitate completion of reaction which may be determined by cessation of NO discharge from the condenser vent.

With regard to ratios of fluorinating agent to metal starting material, theoretical requirements are believed to be approximately six mols of fluorinating agent (basis, NOF constituent) per mol of metal. Experience indicates that fluorinating agent to starting material ratios may vary to some extent, and in this connection ratio of mols of fluorinating agent per mol of metal advantageously may lie in the range of about 4.5–7.5:1. Notably good results may be obtained when reactor feed is regulated so as to charge into the reaction zone quantities of metal and NOF.3HF such as to provide a ratio of mols of fluorinating agent per mol of metal substantially in the preferred range of 5.4–6.8:1. In most cases, it is preferable to use an excess of NOF.3HF.

The following illustrates practice of the invention:

Apparatus comprised a vertically disposed reactor, about 3" I.D. and 9" high, provided at the upper end with a removable cover permitting charging of solids and with a valved inlet for introduction of liquid fluorinating agent, and with a gas outlet. The latter was connected by a conduit with the top of one leg of a U-shaped receiver equipped at the upper end of the other leg with a valved gas outlet. The receiver had an I.D. of about 1.5" and an overall vertical length of about 14". During reaction, most of the length of the receiver was immersed in a Dry Ice-acetone bath. About 139 g. (0.755 mol) of metallic tungsten powder were charged into the reactor. During a period of about 2¼ hours, about 548 g. (5.02 mols) of liquid NOF.3HF were charged slowly into the reactor. Mol ratio of metallic tungsten to NOF.3HF was about one to 6.65. During introduction of NOF.3HF, material in the reactor remained at about 30° C. Reaction was smooth, and the volatile products formed in the reactor were passed into the U-tube receiver which was maintained at temperature of about minus 76–80° C. Nitric oxide (NO) exited the receiver gas outlet, but there was no evidence that any $NO_2$, HF or $WF_6$ was discharged from the receiver along with the nitric oxide. After addition of NOF.3HF to the reactor was completed, the reactor was slowly heated to about 50° C. during a period of about an hour within which evolution of NO from the receiver continued, and after which no further NO was evolved. At the end of the run, the apparatus was disassembled and the reactor contained about 43 g. of liquid. Theoretical weight of reactor residue, for the excess of NOF.3HF used, was about 53 g. The receiver contained about 507 g. of material which initially while at low temperature was white solid suspended in liquid, and after warming up to about 10–15° C. was all liquid. Theoretical weight of the receiver material for total $WF_6$ and HF, was about 498 g. The receiver was chilled with Dry Ice to about minus 76–80° C. to freeze out the $WF_6$ (M.P. 2.5° C.), and about 205 g. of liquid HF containing some $WF_6$ were decanted off, after which the receiver contained about 287 g. of white solid material containing some occluded HF. The solid material in the receiver was warmed up to convert to liquid phase and 239 g. were transferred from the receiver to an evacuated cylinder. The content of the cylinder, 239 g. of $WF_6$ and a small amount of occluded HF, was a clear white liquid. A sample was subjected to NMR fluorine analysis and to wet tungsten and fluorine analyses, and found to contain 37.9% fluorine and 61.3% tungsten as compared with theoretical values for $WF_6$ of 39.2% fluorine and 61.8% tungsten. On disassembly, the reactor was found to contain about 43 g. of NOF.3HF and substantially no unreacted tungsten. Overall results showed yield approximating theoretical.

In the manufacture of $MoF_6$ by reaction of metallic molybdenum and NOF.3HF, procedure is substantially the same as described but modified to take into consideration the 35° C. boiling point and the 17° C. melting point of $MoF_6$. At the end of a run, the refrigerated receiver contains liquid HF and solid $MoF_6$. As before, the bulk of the HF may be decanted off leaving solid $MoF_6$ and some occluded HF. The mass may be melted by warming up to temperature conveniently above the 17° C. melting point of $MoF_6$, e.g. to temperature of 20–25° C. At such temperature most of the occluded HF will have been distilled off leaving relatively pure liquid molybdenum hexafluoride. If greater purity $MoF_6$ is desired, the material may be distilled to separate $MoF_6$ from any possibly residual HF or other impurities.

The herein outlined method for making NOF.3HF and NOF.6HF complexes, from nitrosyl chloride and HF, and the complex products are more fully described and claimed in Anello and Woolf copending application Serial No. 77,805, filed December 23, 1960.

We claim:

1. The process for making metal fluoride which comprises introducing into a reaction zone metallic metal the fluoride of which boils below about 50° C. at atmospheric pressure and freezes above the freezing point of anhydrous hydrogen fluoride, subjecting said metal in said zone to the action of NOF.3HF complex at reactive fluorinating temperature to effect formation of vaporous fluoride of said metal, and discharging vaporous metal fluoride from said reaction zone.

2. The process for making metal fluoride which comprises introducing into a reaction zone metallic metal selected from the group consisting of tungsten and molybdenum, subjecting said metal in said zone to the action of NOF.3HF complex at reactive fluorinating temperature to effect formation of vaporous fluoride of said metal, and discharging vaporous metal fluoride from said reaction zone.

3. The process for making metal fluoride which comprises introducing into a reaction zone particulate metallic metal selected from the group consisting of tungsten and molybdenum, subjecting said metal in said zone to the action of NOF.3HF complex at temperature above the boiling point of the fluoride of said metal and below the boiling point of NOF.3HF complex to effect formation of the said vaporous fluoride of said metal, and discharging the said vaporous metal fluoride from said reaction zone.

4. The process of claim 3 in which reaction temperature is substantially in the range of 10–65° C.

5. The process of claim 3 in which mol ratio of NOF.3HF per mol of metallic metal is substantially in the range of 4.5–7.5:1.

6. The process for making metal fluoride which comprises introducing in a reaction zone particulate metallic metal selected from the group consisting of tungsten and molybdenum, subjecting said metal in said zone to the action of NOF.3HF complex at temperature above the boiling point of the fluoride of said metal and below the boiling point of NOF.3HF complex to effect formation of the said vaporous fluoride of said metal, discharging from said zone reaction products comprising vaporous metal fluoride and vaporous HF, condensing said metal fluoride, and recovering said metal fluoride from the resulting mass.

7. The process of claim 6 in which the metal is molybdenum, and reaction temperature is substantially in the range of 40–65° C.

8. The process of claim 6 in which the metal is tungsten, reaction temperature is substantially in the range of 10–65° C., and mol ratio of NOF.3HF per mol of metallic tungsten is substantially in the range of 5.4–6.8:1.

References Cited by the Examiner

UNITED STATES PATENTS 3,085,862  4/63  Atadan et al. _____ 23—88

OTHER REFERENCES

J. W. Mellor's "A Comprehensive Treatise on Inorganic and Theoretical Chemistry," vol. 11, 1931 ed., pp. 513 and 731, Longmans, Green & Co., New York.

MAURICE A. BRINDISI, *Primary Examiner.*